US010645530B2

(12) United States Patent
Chang et al.

(10) Patent No.: US 10,645,530 B2
(45) Date of Patent: May 5, 2020

(54) METHOD FOR SEARCHING OUT INTERIOR OBJECT AND SERVER

(71) Applicant: Chiun Mai Communication Systems, Inc., New Taipei (TW)

(72) Inventors: Sung-Chieh Chang, New Taipei (TW); Huang-Mu Chen, New Taipei (TW); Liang-Chih Chi, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 160 days.

(21) Appl. No.: 16/004,222

(22) Filed: Jun. 8, 2018

(65) Prior Publication Data

US 2019/0208361 A1  Jul. 4, 2019

(30) Foreign Application Priority Data

Dec. 29, 2017 (CN) .......................... 2017 1 1480433

(51) Int. Cl.
| | |
|---|---|
| *H04W 4/02* | (2018.01) |
| *H04W 4/33* | (2018.01) |
| *G01C 21/20* | (2006.01) |
| *G06Q 30/06* | (2012.01) |
| *G01S 11/06* | (2006.01) |
| *G01C 5/06* | (2006.01) |
| *G01C 21/12* | (2006.01) |
| *G01C 21/36* | (2006.01) |
| *H04W 4/024* | (2018.01) |

(52) U.S. Cl.
CPC .............. *H04W 4/024* (2018.02); *G01C 5/06* (2013.01); *G01C 21/12* (2013.01); *G01C 21/206* (2013.01); *G01C 21/3667* (2013.01); *G01S 11/06* (2013.01); *G06Q 30/0623* (2013.01); *H04W 4/33* (2018.02)

(58) Field of Classification Search
CPC .... H04W 4/024; H04W 4/33; G01C 21/3667; G01C 21/12; G01C 5/06; G01C 21/206; G01S 11/06; G06Q 30/0623
See application file for complete search history.

(56) References Cited

U.S. PATENT DOCUMENTS

2011/0213652 A1* 9/2011 Gillen ................ G06Q 20/045
   705/14.26
2013/0260790 A1* 10/2013 Itzhaki ................ H04W 4/029
   455/456.1

FOREIGN PATENT DOCUMENTS

| CN | 105371849 A | * | 3/2016 |
| CN | 106912003 | | 6/2017 |
| WO | 2012088833 | | 7/2012 |

* cited by examiner

*Primary Examiner* — Rodney A Butler
(74) *Attorney, Agent, or Firm* — ScienBiziP, P.C.

(57) ABSTRACT

A method for searching out an object in a building or group of buildings stores positions of objects in relation to wireless communication base stations. Relative lateral and vertical positions of an electronic device are calculated according to strengths of wireless signals received by the wireless communication base stations from the electronic device and by reference to sensors. Actual distance between the electronic device and the object is determined to be more or less than a preset distance and orientation is also determined. Information as to an object within the preset distance can be transmitted to the electronic device. A server executing the method is also disclosed.

20 Claims, 6 Drawing Sheets

METHOD FOR SEARCHING OUT INTERIOR OBJECT AND SERVER

CROSS-REFERENCE TO RELATED APPLICATIONS

This application claims priority to Chinese Patent Application No. 201711480433.1, filed on Dec. 29, 2017, the contents of which are incorporated by reference herein.

FIELD

The subject matter herein generally relates to services from servers, and especially relates to a server employing an interior object searching method.

BACKGROUND

Large shopping malls have a wide range of goods, but it is difficult to find particular goods in the large shopping mall.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
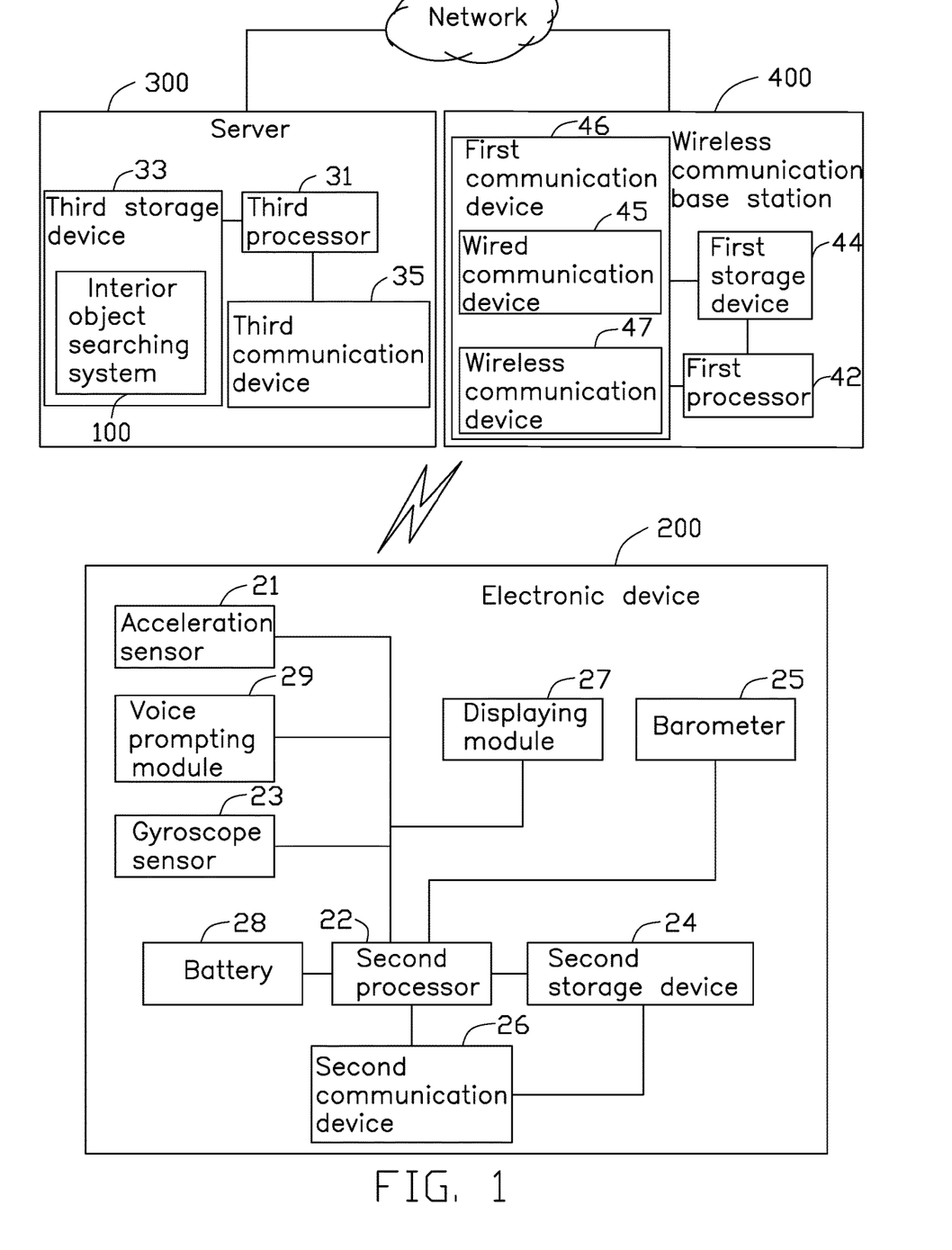
FIG. 1 is a schematic diagram of a server having an interior object searching system and at least one wireless communication base station communicating with an electronic device.

FIG. 1 illustrates a server 300 having an interior object searching system 100 and a number of wireless communication base stations 400 communicating with an electronic device 200. The wireless communication base stations 400 and an at least one object are positioned in a building (for example, a house). The interior object searching system 100 is employed in the server 300 to search for an object in the house through the electronic device 200.

The wireless communication base station 400 may include, but is not limited to, at least one first processor 42, a first storage device 44, and a first communication device 46. The at least one first processor 42, the first storage device 44, and the first communication device 46 are connected to each other. The at least one first processor 42 can be used to calculate and process various kinds of data of the wireless communication base station 400. The first storage device 44 stores program codes of the wireless communication base station 400 and identity information of the wireless communication base station 400. The wireless communication base station 400 can communicate with the electronic device 200 and the server 300 through the first communication device 46. The wireless communication base stations 400 can be WI-FI or Bluetooth™ base stations. The first communication device 46 may include a wired communication device 45 and a wireless communication device 47. The wireless communication base station 400 can communicate with the server 300 in a wired manner through the wired communication device 45. In another embodiment, the wireless communication base station 400 can wirelessly communicate with the server 300 through the wireless communication device 47. The wireless communication base station 400 wirelessly communicates with the electronic device 200 through the wireless communication device 47.

The electronic device 200 may include, but is not limited to, at least one second processor 22, a second storage device 24, and a second communication device 26. The at least one second processor 22, the second storage device 24, and the second communication device 26 are connected to each other. The at least one second processor 22 can be used to calculate and process various kinds of data of the electronic device 200 and data transmitted from the wireless communication base station 400. The second storage device 24 stores program codes of the electronic device 200 and the data transmitted from the wireless communication base station 400. The electronic device 200 can communicate with the server 300 and the wireless communication base station 400 through the second communication device 26. The second communication device 26 further determines strength of wireless signal transmitted to the wireless communication base station 400 from the electronic device 200. The electronic device 200 further includes a battery 28 for providing power to the electronic device 200.

The server 300 may include, but is not limited to, at least one third processor 31, a third storage device 33, and a third communication device 35. The at least one third processor 31, the third storage device 33, and the third communication device 35 are connected to each other. The at least one third processor 31 can be used to calculate and process various kinds of data of the server 300. The third storage device 33 stores program codes of the server 300, position information in the house of the wireless communication base station 400 and position information of an object. The position information of the object includes a relative position between the object and the wireless communication base stations 400. The interior object searching system 100 is employed in the third storage device 33 and executed by at least one of the third processors 31. The third communication device 35 communicates with the wired communication device 45 through a wired network. The third communication device 35 communicates with the second communication device 26 through a wireless network.

Figure 2:
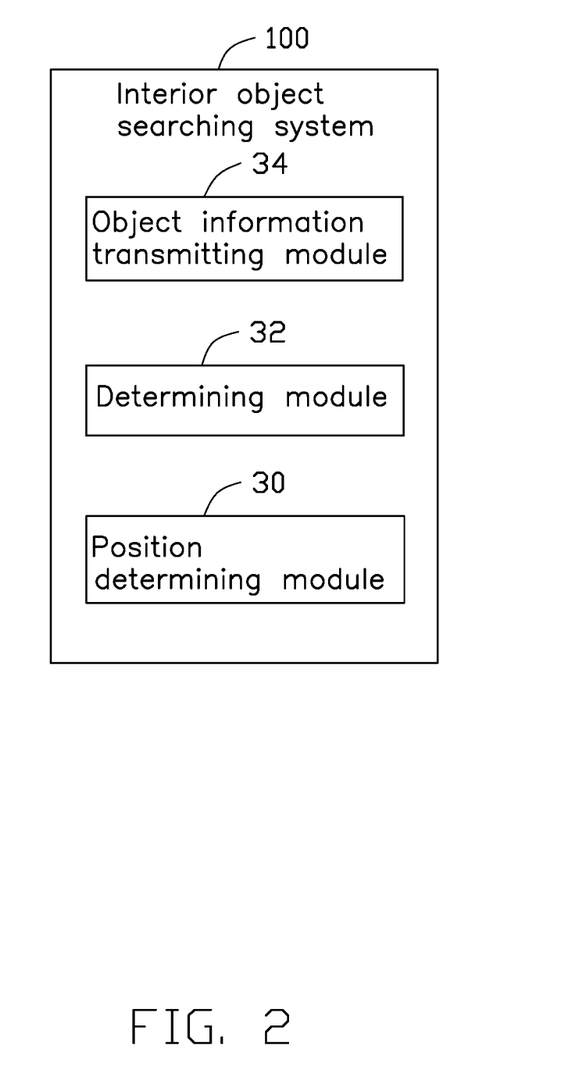
FIG. 2 is a block diagram of the interior object searching system in the FIG. 1.

FIG. 2 illustrates the interior object searching system 100 including a position determining module 30, a determining module 32, and an object information transmitting module 34. The position determining module 30 can be configured to determine position information of the electronic device 200 according to a position of the electronic device 200 relative to at least three of the wireless communication base stations 400 and the position information of the at least three wireless communication base stations 400 in the house. The position of the electronic device 200 relative to the at least three wireless communication base stations 400 are calculated according to the strengths of wireless signals received by the wireless communication base stations 400 from the electronic device 200.

In another embodiment, the position information of the object further includes angle information the object and height information of the object, assuming multiple floors in the house. The position information of the electronic device 200 further includes angle information of the electronic device 200. The electronic device 200 includes an acceleration sensor 21. The acceleration sensor 21 is configured to acquire the angle information of the electronic device 200.

In another embodiment, the position information of the object further includes orientation information of the object. The position information of the electronic device 200 further includes orientation information of the electronic device 200. The electronic device 200 can include a gyroscope sensor 23. The gyroscope sensor 23 is configured to acquire the orientation information of the electronic device 200.

In another embodiment, the house includes multiple floors. The position information of the object further can include floor information indicating which floor the object is on. The position information of the electronic device 200 further includes floor information where the electronic device 200 is located. The electronic device 200 includes a barometer 25. The barometer 25 is configured to obtain barometric pressure of the electronic device 200 and calculate the floor information of the electronic device 200 according to the barometric pressure.

The position information of the wireless communication base station 400 can also include floor information indicating which floor the wireless communication base station 400 is on. The identity information of the wireless communication base station 400 can include the floor information indicating which floor the wireless communication base station 400 is on. The floor information of the object can be associated with the identity information of the wireless communication base station 400.

The determining module 32 is configured to determine whether an actual distance between the electronic device 200 and the object is less than a preset distance. The actual distance is calculated according to the position information of the electronic device 200 and the position information of the object. A result of determining whether an actual distance between the electronic device 200 and the object is less than a preset distance is transmitted to the server 300 through the wireless communication base station 400 and the result is stored in the server 300.

The object information transmitting module 34 is configured to transmit a business information of the object within the preset distance to the electronic device 200. The information of the object can be an electronic coupon or commodity information, including a price of the object. The electronic device 200 further includes a displaying module 27 and a voice prompting module 29. The displaying module 27 is configured to display the information of the object on the electronic device 200. The voice prompting module 29 is configured to audibly describe the information of the object.

Figure 3:
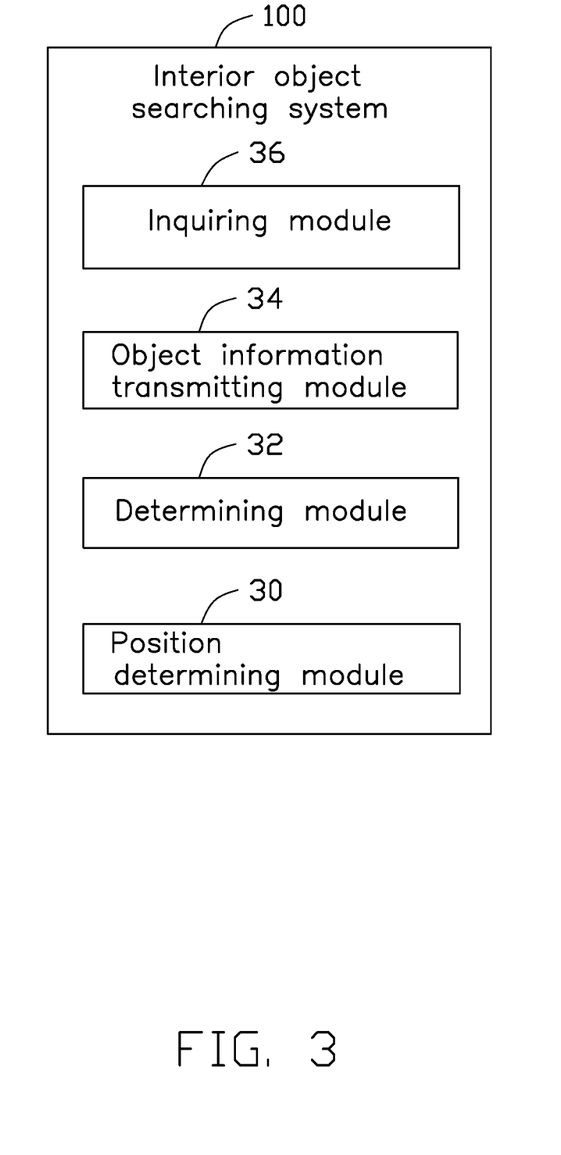
FIG. 3 is a block diagram of an interior object searching system, according to another exemplary embodiment.
Figure 4:
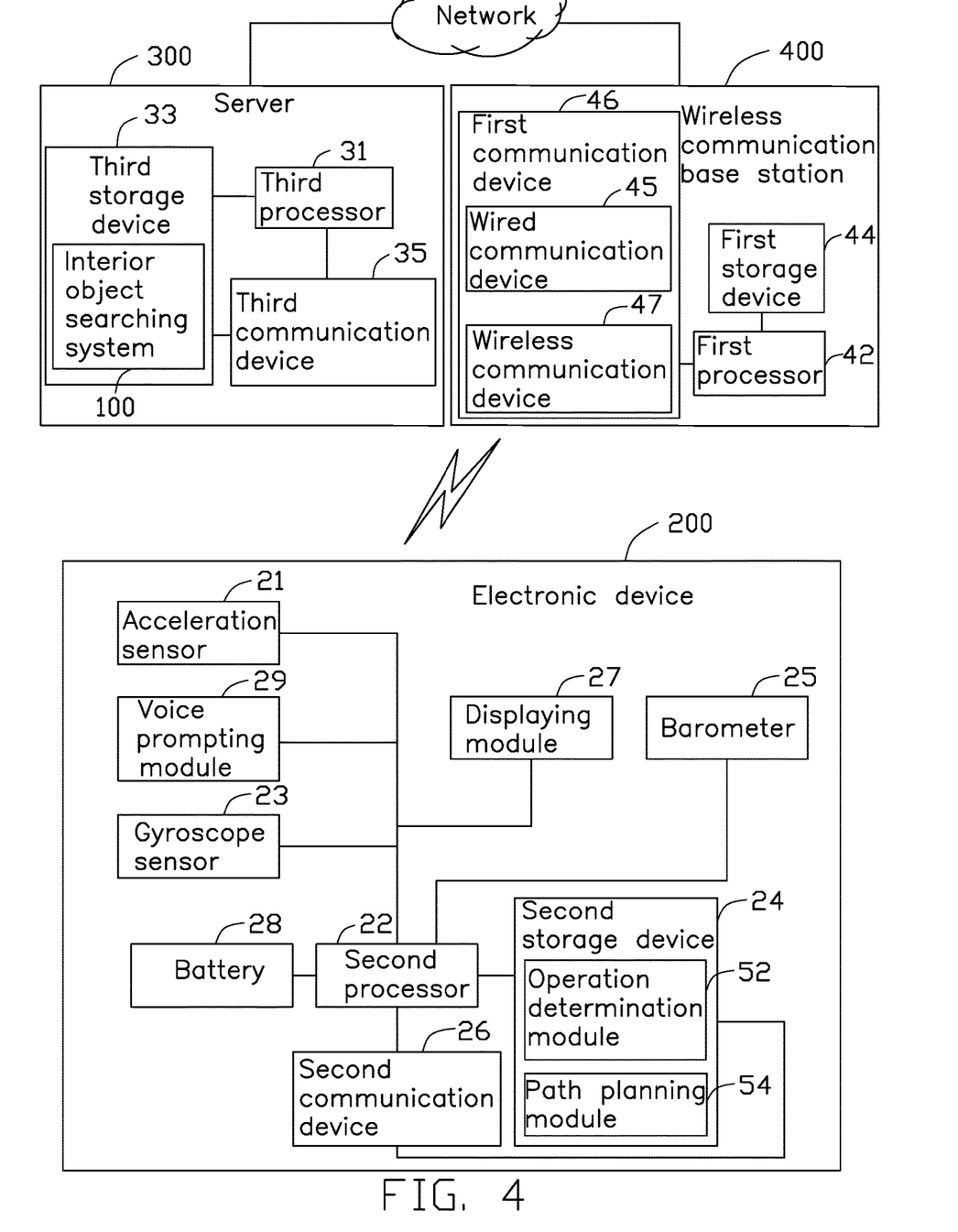
FIG. 4 is a schematic diagram of a server having the interior object searching system in FIG. 3 and at least one wireless communication base station communicating with an electronic device.

FIG. 3 illustrates, in another embodiment, an interior object searching system 100 which further includes an inquiring module 36. FIG. 4 illustrates, in the same embodiment, the electronic device 200 further includes an operation determination module 52 and a path planning module 54.

The inquiring module 36 is configured to transmit an enquiry as to an object to the electronic device 200 to inquire whether the object is needed. The operation determination module 52 is configured to confirm the object is needed according to a user operation on the electronic device 200. The inquiring module 36 is further configured to transmit the position information of the object to the electronic device 200. The path planning module 54 is configured to plan a navigation path from the electronic device 200 to the object according to the position information of the electronic device 200 and the position information of the object. The displaying module 27 is further configured to display such path on the electronic device 200.

Figure 5:
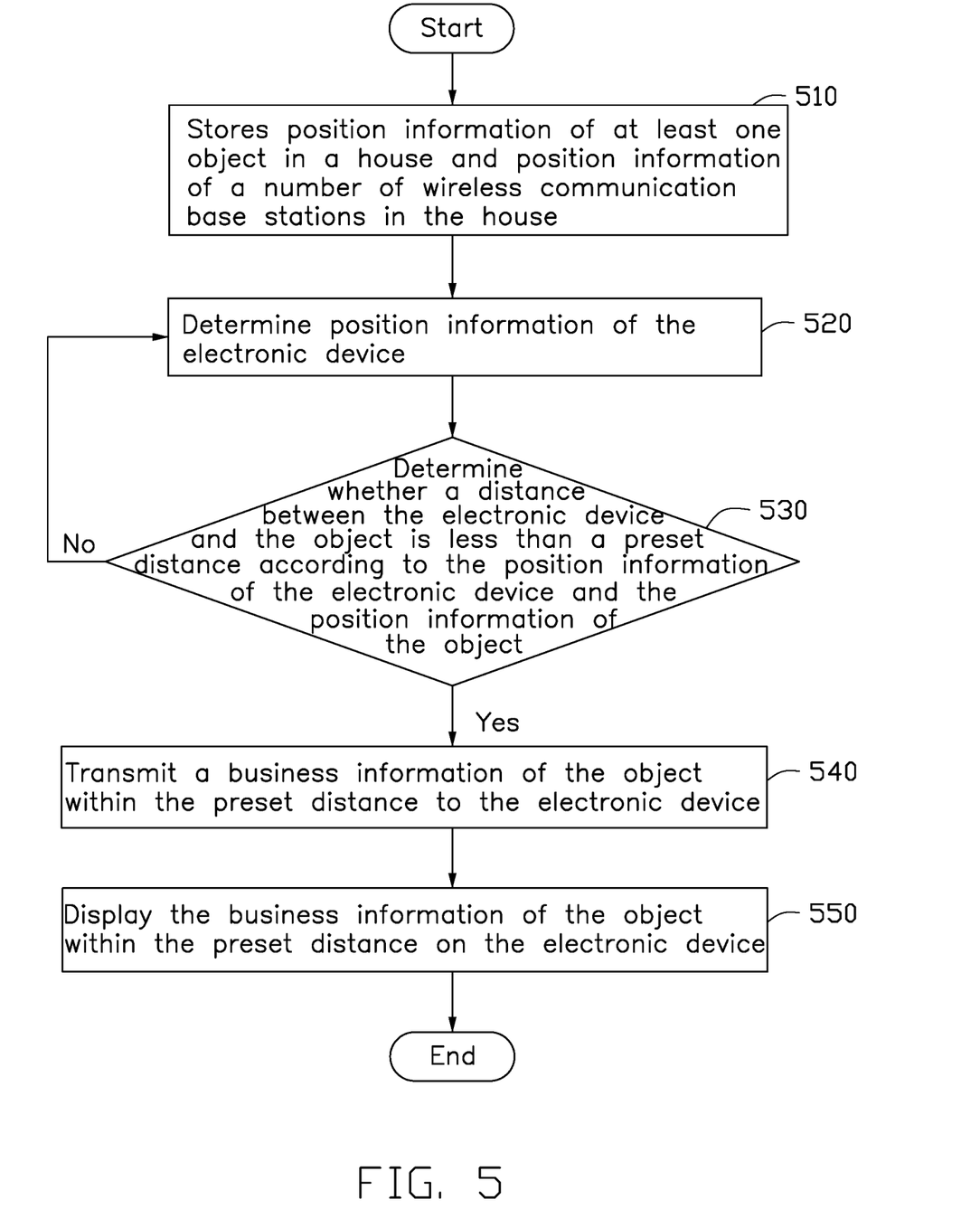
FIG. 5 is a flowchart of a method for searching out interior object according to a first exemplary embodiment.

FIG. 5 illustrates a flowchart of one embodiment of a method for searching out interior object in a house. The example method is provided by way of example, as there are a variety of ways to carry out the method. The method described below can be carried out using the configurations illustrated in FIG. 3 and FIG. 4, for example, and various elements of these figures are referenced in the example method. Each block shown in FIG. 5 represents one or more processes, methods or subroutines, carried out in the exemplary method. Additionally, the illustrated order of blocks is by example only and the order of the blocks can be changed according to the present disclosure. The exemplary method can begin at block 510. Depending on the embodiment, additional steps can be added, others removed, and the ordering of the steps can be changed.

At block 510, the third storage device 33 stores position information of at least one object in a house and position information of a number of wireless communication base stations 400 in the house. The position information of the object includes a position of the object relative to the wireless communication base stations 400.

At block 520, the position determining module 30 determines position information of the electronic device 200 according to a position of the electronic device 200 relative to at least three of the wireless communication base stations 400 and the position information of the at least three wireless communication base stations 400 in the house. The relation position between the electronic device 200 and the at least three wireless communication base stations 400 is calculated according to strengths of wireless signals received by the wireless communication base station 400 from the electronic device 200.

At block 530, the determining module 32 determines whether a distance between the electronic device 200 and the object is less than a preset distance according to the position information of the electronic device 200 and the position information of the object. If the distance between the electronic device 200 and the object is less than the preset distance, the procedure goes to block 540, otherwise the procedure goes to block 520.

At block 540, the object information transmitting module 34 transmits a business information of the object within the preset distance to the electronic device 200. The business information of the object can be an electronic coupon or commodity information including a price of the object.

At block 550, the displaying module 27 displays the business information of the object within the preset distance on the electronic device 200.

In another embodiment, the position information of the object further includes angle information of the object and height information of the object. The position information of the electronic device 200 further includes angle information of the electronic device 200. The angle information of the electronic device is acquired by the acceleration sensor 21 installed on the electronic device 200.

In another embodiment, the position information of the object further includes orientation information of the object. The position information of the electronic device 200 further includes orientation information of the electronic device 200. The orientation information of the electronic device 200 is acquired by the gyroscope sensor 23 installed on the electronic device 200.

In another embodiment, the position information in the house of the object further includes floor information indicating which floor the object is on. The position information of the electronic device 200 further includes floor information indicating which floor the electronic device 200 is on. The floor information of the electronic device 200 is calculated by the electronic device 200 according to a barometric pressure detected by the barometer 25 installed on the electronic device 200.

In another embodiment, the position information of the wireless communication base station 400 includes floor information indicating which floor the wireless communication base station 400 is on. The identity information of the wireless communication base station 400 includes the floor information indicating which floor the wireless communication base station 400 is on. The floor information of the object is associated with the identity information of the wireless communication base station 400.

In another embodiment, the block 550 can be removed.

Figure 6:
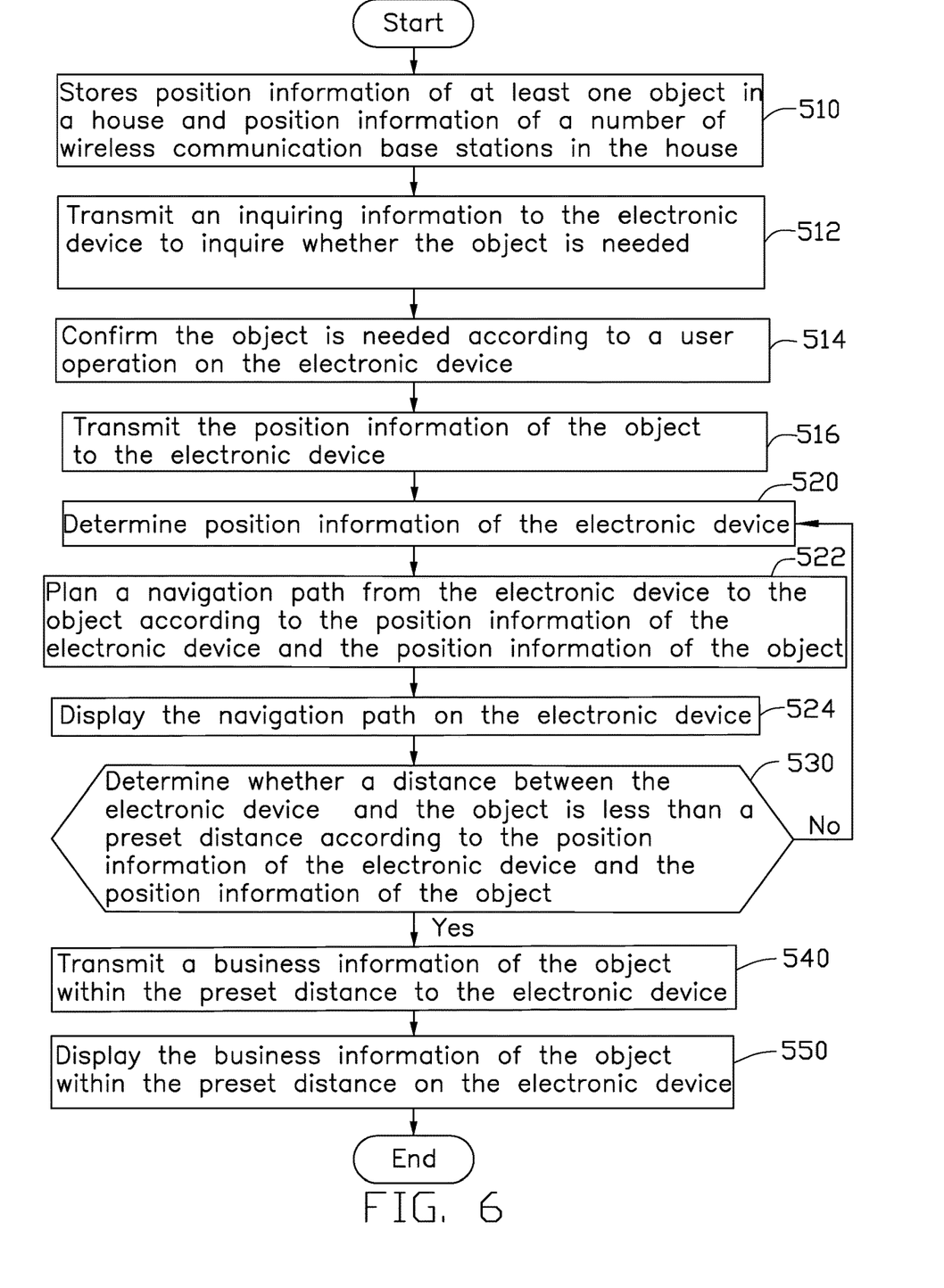
FIG. 6 is a flowchart of a method for searching out interior object, according to a second exemplary embodiment.

FIG. 6 illustrates a flowchart of another embodiment of search an object in a house. This example method further includes following blocks.

At block 512, the inquiring module 36 transmits an inquiring information to the electronic device 200 to inquire whether the object is needed.

At block 514, the operation determination module 52 confirms the object is needed according to a user operation on the electronic device 200.

At block 516, the inquiring module 36 transmits the position information of the object to the electronic device 200.

At block 522, the path planning module 54 plans a navigation path from the electronic device 200 to the object according to the position information of the electronic device 200 and the position information of the object.

At block 524, the displaying module 27 displays the navigation path on the electronic device 200.

In one embodiment, the inquiring information includes inquiring information of a number of objects. When the electronic device confirms the objects are all needed, the navigation path guides the electronic device 200 to each of the objects.

In another embodiment, the blocks 522 and 524 can be removed.

The exemplary embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A method for searching out interior object comprising:
storing position information and business information of at least one object in a building and position information of a plurality of wireless communication base stations in the building, the position information of the at least one object comprising a first position of the object relative to the wireless communication base stations;
determining position information of an electronic device according to a second position of the electronic device relative to at least three of the wireless communication base stations and the position information of the at least three wireless communication base stations in the building, the second position of the electronic device being calculated according to strengths of wireless signals received by the at least three wireless communication base stations from the electronic device;
determining whether a distance between the electronic device and the object is less than a preset distance according to the position information of the electronic device and the position information of the object; and
transmitting the business information of the object within the preset distance to the electronic device when the distance between the electronic device and the object is less than the preset distance.

2. The method as claimed in claim 1, further comprising:
displaying the business information of the object within the preset distance on the electronic device.

3. The method as claimed in claim 1, wherein the position information of the object further comprises angle information and height information of the object, the position information of the electronic device further comprises angle information of the electronic device, the angle information of the electronic device is acquired by an acceleration sensor installed on the electronic device.

4. The method as claimed in claim 1, wherein the position information of the object further comprises orientation information of the object, the position information of the electronic device further comprises orientation information of the electronic device, the orientation information of the electronic device is acquired by a gyroscope sensor installed on the electronic device.

5. The method as claimed in claim 1, wherein the position information of the object further comprises floor information indicating which floor the object is on, the position information of the electronic device further comprises floor information indicating which floor the electronic device is on, the floor information of the electronic device is calculated by the electronic device according to a barometric pressure detected by a barometer installed on the electronic device.

6. The method as claimed in claim 1, wherein the business information of the object is an electronic coupon.

7. The method as claimed in claim 1, wherein the wireless communication base stations are Bluetooth™ base stations or Wi-Fi base stations.

8. The method as claimed in claim 1, further comprising:
transmitting an inquiring information to the electronic device to inquire whether the object is needed;
confirming the object is needed according to a user operation on the electronic device; and
transmitting the position information of the object to the electronic device.

9. The method as claimed in claim 8, further comprising:
planning a navigation path from the electronic device to the object according to the position information of the electronic device and the position information of the object; and
displaying the navigation path on the electronic device.

10. The method as claimed in claim 9, wherein the inquiring information includes inquiring information of a plurality of objects, when the electronic device confirms the objects are all needed, the navigation path guides the electronic device to each of the objects.

11. A server, comprising:
a storage device that stores one or more programs, position information and business information of at least one object in a building and position information of a plurality of wireless communication base stations in the building, the position information of the object comprising a first position of the object relative to the wireless communication base stations;
at least one processor; and
the one or more programs when executed by the at least one processor, cause the at least one processor to:
determine position information of an electronic device according to a second position of the electronic device relative to at last three of the wireless communication base stations and the position information of the at least three wireless communication base stations in the building, the second position of the electronic device being calculated according to strengths of wireless signals received by the at least three wireless communication base stations from the electronic device;
determine whether a distance between the electronic device and the object is less than a preset distance according to the position information of the electronic device and the position information of the object; and
transmit the business information of the object within the preset distance to the electronic device when the distance between the electronic device and the object is less than the preset distance.

12. The server as claimed in claim 11, wherein the at least one processor is further caused to:
transmit an inquiring information to the electronic device to inquire whether the object is needed; and
transmit the position information of the object needed corresponding to a user operation on the electronic device to the electronic device.

13. The server as claimed in claim 11, wherein the position information of the object further comprises angle information and height information of the object, the position information of the electronic device further comprises angle information of the electronic device, the angle information of the electronic device is acquired by an acceleration sensor installed on the electronic device.

14. The server as claimed in claim 11, wherein the position information of the object further comprises orientation information of the object, the position information of the electronic device further comprises orientation information of the electronic device, the orientation information of the electronic device is acquired by a gyroscope sensor installed on the electronic device.

15. The server as claimed in claim 11, wherein the position information of the object further comprises floor information indicating which floor the object is on, the position information of the electronic device further comprises floor information indicating which floor the electronic device is on, the floor information of the electronic device is calculated by the electronic device according to a barometric pressure detected by a barometer installed on the electronic device.

16. The server as claimed in claim 11, wherein the business information of the object is an electronic coupon.

17. A non-transitory storage medium having stored thereon instructions that, when executed by at least one processor, causes the processor to perform a method for providing searching an object in a house, wherein the method comprises:
storing position information and business information of at least one object in a building and position information of a plurality of wireless communication base stations in the building, the position information of the at least one object comprising a first position of the object relative to the wireless communication base stations;
determining position information of an electronic device according to a second position of the electronic device relative to at least three of the wireless communication base stations and the position information of the at least three wireless communication base stations in the building, the second position of the electronic device being calculated according to strengths of wireless signals received by the at least three wireless communication base stations from the electronic device;
determining whether a distance between the electronic device and the object is less than a preset distance according to the position information of the electronic device and the position information of the object; and
transmitting the business information of the object within the preset distance to the electronic device when the distance between the electronic device and the object is less than the preset distance.

18. The non-transitory storage medium according to claim 17, wherein the method further comprises:
transmitting an inquiring information to the electronic device to inquire whether the object is needed; and
transmitting the position information of the object corresponding to a user operation on the electronic device to the electronic device.

19. The non-transitory storage medium according to claim 17, wherein the business information of the object is an electronic coupon.

20. The non-transitory storage medium according to claim 17, wherein the business information of the object comprises a price of the object.

* * * * *